United States Patent
de Léon et al.

(10) Patent No.: US 8,769,571 B2
(45) Date of Patent: Jul. 1, 2014

(54) SYSTEM AND METHOD FOR GENERATING A VISUAL SUMMARY OF PREVIOUSLY VIEWED MULTIMEDIA CONTENT

(75) Inventors: David de Léon, Lund (SE); Bjorn Lindberg, London (GB); Joakim Mårtensson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 99 days.

(21) Appl. No.: 13/256,504

(22) PCT Filed: Oct. 19, 2010

(86) PCT No.: PCT/IB2010/002672
§ 371 (c)(1),
(2), (4) Date: Sep. 14, 2011

(87) PCT Pub. No.: WO2012/052790
PCT Pub. Date: Apr. 26, 2012

(65) Prior Publication Data
US 2012/0284094 A1     Nov. 8, 2012

(51) Int. Cl.
*H04N 5/445* (2011.01)
*G06F 17/30* (2006.01)

(52) U.S. Cl.
CPC .................. *G06F 17/30843* (2013.01)
USPC .......................................................... 725/38

(58) Field of Classification Search
CPC .................. H04N 21/44204; H04N 21/4325; H04N 21/6587; H04N 21/26258; H04N 21/4316
See application file for complete search history.

(56) References Cited

U.S. PATENT DOCUMENTS

| | | | | |
|---|---|---|---|---|
| 5,818,439 A | * | 10/1998 | Nagasaka et al. | 725/87 |
| 2006/0143652 A1 | * | 6/2006 | Chung | 725/43 |
| 2010/0214475 A1 | * | 8/2010 | Yazawa | 348/468 |
| 2010/0310232 A1 | * | 12/2010 | Iwase et al. | 386/241 |

FOREIGN PATENT DOCUMENTS

WO     2007036833     4/2007

OTHER PUBLICATIONS

Uchihashi et al., "Video Manga: Generating Semantically Meaningful Video Summaries", ACM Multimedia, Proceedings of the International Conference, New York, NY, Jan. 1999, pp. 383-392.
Barbieri et al., "Video summarization: methods and landscape", Proceedings of SPIE, The International Society for Optical Engineering SPIE, USA, vol. 5242, Sep. 2003, pp. 1-13.

* cited by examiner

*Primary Examiner* — Jefferey Harold
*Assistant Examiner* — Samira Monshi
(74) *Attorney, Agent, or Firm* — Renner, Otto, Boisselle & Sklar, LLP

(57) ABSTRACT

A method (100) and electronic device (10) for resuming multimedia content playback for display on the electronic device. The method includes: receiving a command to render multimedia content from a user input device (20), wherein the multimedia content includes previously viewed multimedia content and un-viewed multimedia content; selecting one or more segments of the previously viewed multimedia content; displaying a thumbnail that corresponds to the selected one or more segments on a display (18) of the electronic device to provide a visual summary of the previously viewed content; and displaying at least a portion of the un-viewed multimedia content after at least a portion of the visual summary is displayed on the display.

20 Claims, 7 Drawing Sheets

Previously Viewed Content

SYSTEM AND METHOD FOR GENERATING A VISUAL SUMMARY OF PREVIOUSLY VIEWED MULTIMEDIA CONTENT

TECHNICAL FIELD OF THE INVENTION

The present invention relates to a system and method for rendering multimedia content. In particular, the present invention is directed to providing a visual summary of previously viewed multimedia content prior to resumption of un-viewed multimedia content.

DESCRIPTION OF THE RELATED ART

Mobile telephones have evolved from voice-only electronic devices to multi-functional electronic devices. For example, mobile telephones may now function as electronic organizers, digital cameras, audio applications (e.g., MP3 players), video applications (e.g., video players), video game terminals, etc. Moreover, mobile telephones are not only used for voice communications, but they also are used in a variety of other forms (e.g., in instant messaging applications, sharing photographs, gaining access to information on the Internet, etc).

In addition, consumers are consuming video content on their mobile devices at an increasing rate. In addition to short video clips on YouTube®, people are now viewing longer films, TV shows and video podcasts on their mobile devices.

Because users of mobile device generally do not have long periods of uninterrupted time, longer multimedia content is usually consumed in a number of separate sessions. This is especially true in a mobile context where the probability of interruption is great.

SUMMARY

A problem facing users, when resuming playback of a multimedia content on a mobile device after a longer interruption, is recalling what transpired just before the interruption. For example, what happened in the story?; what was previously said in the lecture?, etc.). A related, and equally important problem is that of getting the view of the content back in the right mood and/or frame of mind for viewing un-viewed portions of the multimedia content.

A strong need exists for a system and method for dynamically generating a visual summary to help users of electronic devices recall previously viewed content, when the user resumes viewing multimedia content after an interruption (or a voluntary break).

One aspect of the invention relates to a method for resuming multimedia content playback for display on an electronic device, the method includes: receiving a command to render multimedia content from a user input device, wherein the multimedia content includes previously viewed multimedia content and un-viewed multimedia content; selecting one or more segments of the previously viewed multimedia content; displaying a thumbnail that corresponds to the selected one or more segments on a display of the electronic device to provide a visual summary of the previously viewed content; and displaying at least a portion of the un-viewed multimedia content after at least a portion of the visual summary is displayed on the display.

Another aspect of the invention relates to the one or more segments being selected based upon a segment selection algorithm.

Another aspect of the invention relates to the one or more segments are selected based upon dividing the previously viewed multimedia content into a fixed quantity of previously viewed segments.

Another aspect of the invention relates to a portion of each of the previously viewed segments are aggregated to form the one or more segments.

Another aspect of the invention relates to each thumbnail of the selected one or more segments being presented on the display in a collage format.

Another aspect of the invention relates to each thumbnail of the selected one or more segments being presented in a sequential manner based on a temporal order of the previously viewed content.

Another aspect of the invention relates to receiving user input to bypass display of at least a portion of the visual summary.

One aspect of the invention relates to an electronic device including: a memory for storing multimedia content and a content review application; a user input device for receiving a command to render multimedia content stored on the electronic device, wherein the multimedia content includes at least one multimedia application that includes previously viewed multimedia content and un-viewed multimedia content; a processor coupled to the user input device and the memory, wherein the processor processes the previously viewed multimedia content according to the content review application to select one or more segments to form a visual summary that includes a thumbnail that corresponds to the one or more selected segments of the previously viewed multimedia content; and a display coupled to the processor, wherein the display presents the visual summary to an associated of the electronic device prior to displaying at least a portion of the un-viewed multimedia content.

Another aspect of the invention relates to the electronic device being a mobile telephone.

Another aspect of the invention relates to the user input device being a keypad.

Another aspect of the invention relates to the user input device being a touch screen.

Another aspect of the invention relates to the content review application processing the previously viewed multimedia content based upon a segment selection algorithm.

Another aspect of the invention relates to the one or more segments being selected based upon dividing the previously viewed multimedia content into a fixed quantity of previously viewed segments.

Another aspect of the invention relates to the thumbnails for each of the previously viewed segments being accumulated to form the visual summary.

Another aspect of the invention relates to the visual summary being a collage presented on the display, wherein the collage includes thumbnails associated with each of the selected one or more segments.

Another aspect of the invention relates to at least one thumbnail being associated with a video clip of the selected segment.

Another aspect of the invention relates to the visual summary including presenting each thumbnail of the selected one or more segments in a sequential manner based on a temporal order of the previously viewed content.

Another aspect of the invention relates to the visual summary including one or more advertisements embedded within the visual summary.

Another aspect of the invention relates to the visual summary including one or more product placement indexes in the visual summary.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
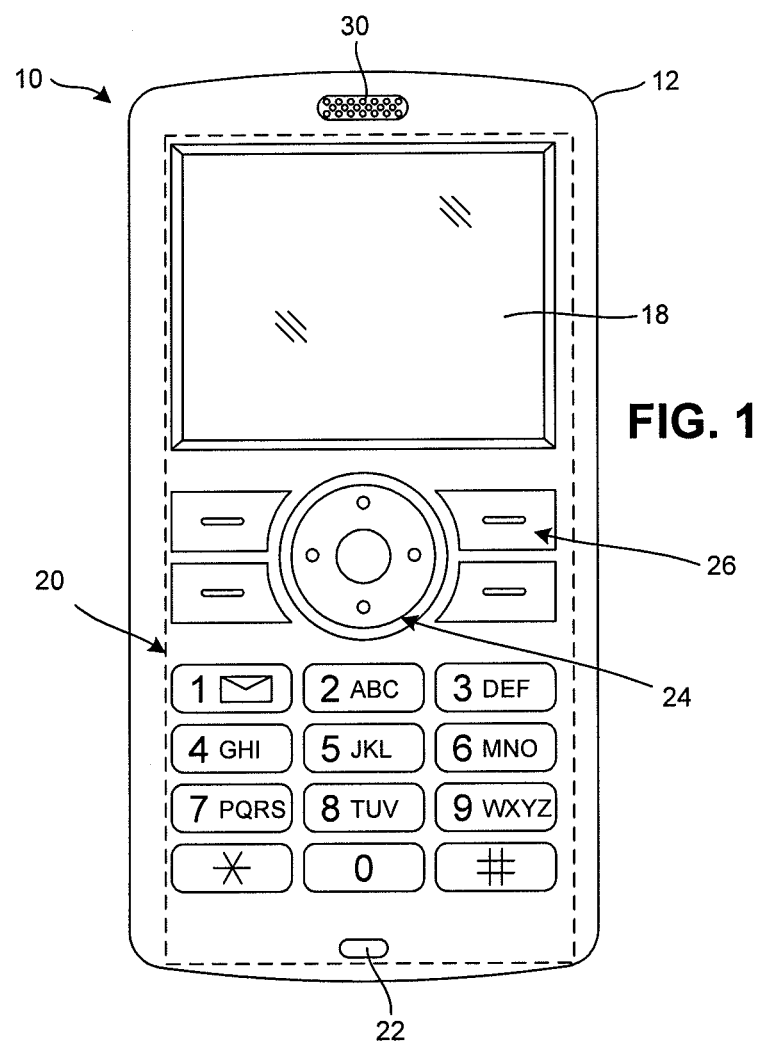
FIG. 1 is a schematic view of one embodiment of a mobile telephone as an exemplary electronic device in accordance with the present invention.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form. The present invention will now be described with reference to the drawings, wherein like reference numerals are used to refer to like elements throughout.

The term "electronic device" includes any type of device that utilizes electrical components to perform a communication task and includes all equipment such as mobile telephones, pagers, communicators, electronic organizers, personal digital assistants (PDAs), smartphones, portable communication apparatus or the like. Other exemplary electronic devices may include, but are not limited to, portable media players, media players, playback devices, media jukeboxes, digital video disk players, etc. In the present application, the invention is described primarily in the context of a mobile telephone. However, it will be appreciated that the invention is not intended to be limited to a mobile telephone and can be any type of electronic device.

The present invention relates to a system and method for rendering multimedia content, wherein a visual summary of previously viewed multimedia content is presented to the user after a pause and/or interruption in viewing the multimedia content and prior to resumption of the previously unviewed multimedia content. For example, a user of the electronic device is watching a television show having a certain duration on a display formed in and/or coupled to the electronic device. After viewing the television show for a period of time, the user is interrupted and must pause and/or stop viewing the television show. An hour later, the user would like to resume viewing the remaining portion of the television show.

A problem facing users, when resuming playback of a multimedia content after an interruption, is recalling what transpired before the interruption. For example, what happened in the story?; what was previously said in the lecture?; etc.). A related, and equally important, problem is that of getting the user back in the right mood and/or frame of mind for viewing a particular portion of multimedia content.

Referring to FIG. 1, an electronic device 10 is shown in accordance with aspects of the present invention. The illustrated electronic device 10 in the exemplary embodiment is a mobile telephone and will be referred to as the mobile telephone 10. The mobile telephone 10 is shown as having a "brick" or "block" form factor housing, but it will be appreciated that other housing types may be utilized, such as a "flip-open" form factor (e.g., a "clamshell" housing), a slide-type form factor (e.g., a "slider" housing); or touch screen-type housing, for example.

Figure 2:
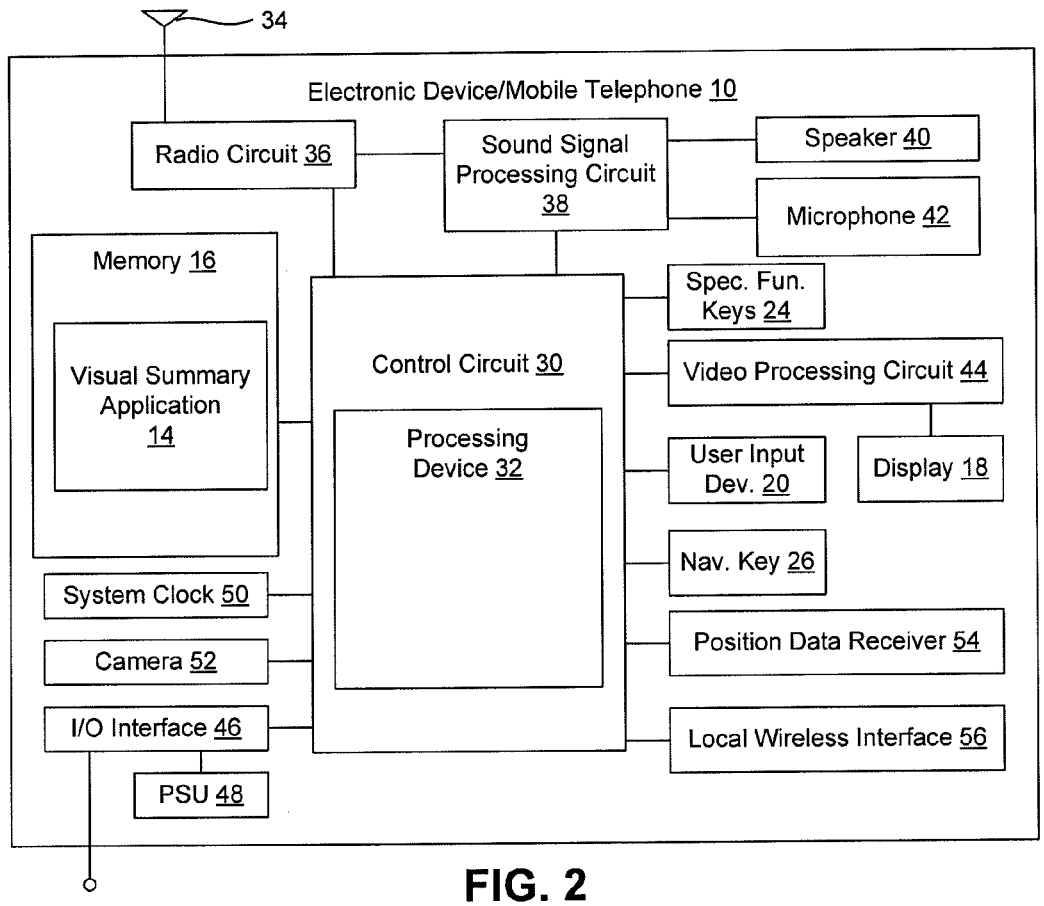
FIG. 2 is a schematic block diagram of the relevant portions of the mobile telephone of FIG. 1.

Referring initially to FIGS. 1 and 2, an exemplary mobile telephone 10 is shown. As discussed below, the mobile telephone 10 includes a visual summary application 14 that is may be stored in a memory (e.g., memory 16) of the mobile telephone 10. The visual summary application 14 may be utilized for resuming multimedia content playback after an interruption in viewing of the multimedia content occurs. In general, a user enters a command to resume rendering multimedia content that has not been fully rendered to the user. Thus, the multimedia content will generally include previously viewed multimedia content (e.g., multimedia content presented to the user) and un-viewed multimedia content (e.g., multimedia content not yet viewed by the user). The visual summary application 14 generally selects one or more segments of the previously viewed multimedia content and displays a thumbnail that corresponds to the selected one or more segments on a display of the electronic device to provide a visual summary of the previously viewed content. After the visual summary has been displayed, the un-viewed multimedia content may be presented to the user. For purposes of this disclosure a thumbnail is a miniature version of an image that is used to provide a link to other content, such as a larger version of the image and/or a video clip associated with the thumbnail.

The mobile telephone 10 may include a display 18. The display 18 may be integrated with the mobile telephone 10 or the display may be coupled to the mobile device (e.g., similar to a DVD player coupled to a television). The display 18 displays information to a user such as operating state, time, telephone numbers, contact information, various navigational menus, etc., through a graphical user interface (GUI) that enables the user to utilize the various features of the mobile telephone 10. The display 18 also may be used to visually display content received by the mobile telephone 10 and/or retrieved from a memory 16 (FIG. 2) or other storage element operatively coupled to the mobile telephone 10. The display 18 may be used to present multimedia content to the user of the mobile telephone 10.

The multimedia content may be any type of content and includes, for example, images, videos and other graphics, such as photographs, Internet content, presence information, movies, songs, video, podcasts, navigation through various menus and/or applications associated with the mobile telephone 10., etc.

The mobile telephone 10 may further include a user input device 20. Such a user input device may be a keypad, touch screen (not shown), microphone 22, and/or navigation key 24. The user input device 20 generally provides for a variety of user input operations. For example, the user input device 20 may include alphanumeric keys for allowing entry of alphanumeric information (e.g., a key pad) such as telephone numbers, phone lists, contact information, notes, etc. In addition, the user input device 20 may include special function keys 26 such as a "call send" key for initiating or answering a call, and a "call end" key for ending or "hanging up" a call. Special function keys 26 also may include menu navigation and select keys to facilitate navigating through a menu displayed on the display 18. For instance, a pointing device and/or navigation keys may be present to accept directional inputs from a user. Special function keys 26 may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 18. Also, the display 18 and user input device 20 may be used in conjunction with one another to implement soft key functionality.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The mobile telephone 10 may be configured to transmit, receive and/or process data, such as text messages (e.g., a text message is commonly referred to by some as "an SMS," which stands for simple message service), instant messages, electronic mail messages, multimedia messages (e.g., a multimedia message is commonly referred to by some as "an MMS," which stands for multimedia message service), image files, video files, audio files, ring tones, streaming audio, streaming video, data feeds (including podcasts) and so forth. Processing such data may include storing the data in the memory 16, executing applications to allow user interaction with data, displaying video and/or image content associated with the data, outputting audio sounds associated with the data and so forth.

FIG. 2 represents a functional block diagram of the mobile telephone 10. For the sake of brevity, generally conventional features of the mobile telephone 10 will not be described in great detail herein. The mobile telephone 10 includes a primary control circuit 30 that is configured to carry out overall control of the functions and operations of the mobile telephone 10. The control circuit 30 may include a processing device 32, such as a CPU, microcontroller or microprocessor. The processing device 32 executes code stored in a memory (not shown) within the control circuit 30 and/or in a separate memory, such as the memory 16, in order to carry out operation of the mobile telephone 10. The memory 16 may be, for example, one or more of a buffer, a flash memory, a hard drive, a removable media, a volatile memory, a non-volatile memory, a random access memory (RAM), or other suitable device.

The memory 16 may store multimedia content from any source. For example, multimedia content may be downloaded from a server (e.g., Internet, YouTube®, Itunes®, etc.), read from a storage device (e.g., a disk driver, flash drive, SD, MemoryStick®, etc.). The multimedia content may include audio and/or video presentations stored locally in memory 16 (FIG. 2) of the mobile telephone 10 and/or stored remotely from the mobile telephone 10 (e.g., on a remote storage device, a media server, remote personal computer, etc.). Such presentations may be derived, for example, from multimedia files, including audio and/or video files, from a received mobile radio and/or television signal, etc. In most situations, the video presentations are accompanied by audio presentations. For example, the displayed video component may be a television show and/or music video, where the corresponding audio component may be audio that is intended to be synchronized with the video component. As another example, the displayed video component may correspond to a received mobile television signal and the corresponding audio component may be speech and/or music intended to be synchronized with the video component.

The memory 16 may also store one or more applications (e.g., visual summary application 14) to facilitate generation of a visual summary as discussed herein. The memory 16 is operatively coupled to the processor 32 for execution of the one or more applications stored therein. The processor 32 is programmed to perform the functionality described herein, for example, controlling one or more software applications, receiving and storing user input, generating a visual summary, etc.

The processing device 32 may execute code that implements the visual summary application 14. It will be apparent to a person having ordinary skill in the art of computer programming, and specifically in application programming for mobile telephones or other electronic devices, how to program a mobile telephone 10 to operate and carry out logical functions associated with the visual summary application 14 described herein. Accordingly, details as to specific programming code have been left out for the sake of brevity. Also, while the visual summary application 14 is executed by the processing device 32 in accordance with a preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 34 coupled to a radio circuit 36. The radio circuit 36 includes a radio frequency transmitter and receiver for transmitting and receiving signals via the antenna 34 as is conventional. The radio circuit 36 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 38 for processing audio signals transmitted by and received from the radio circuit 36. Coupled to the sound processing circuit 38 are a speaker 40 and a microphone 42 that enable a user to listen and speak via the mobile telephone 10 as is conventional.

The radio circuit 36 and sound processing circuit 38 are each coupled to the control circuit 30 so as to carry out overall operation. Audio data may be passed from the control circuit 30 to the sound signal processing circuit 38 for playback of audio to the user. The audio data may include, for example, audio data from an audio file stored in the memory 16 and retrieved by the control circuit 30, or received audio data such as in the form of streaming audio data from a mobile radio service. The sound processing circuit 38 may include any appropriate buffers, decoders, amplifiers and so forth.

The display 18 may be coupled to the control circuit 30 by a video processing circuit 44 that converts video data to a video signal used to drive the display 18. The video processing circuit 44 may include any appropriate buffers, decoders, video data processors and so forth. The video data may be generated by the control circuit 30, generated by the visual summary application 14, retrieved from a video file that is stored in the memory 16, derived from an incoming video data stream that is received by the radio circuit 36 or obtained by any other suitable method.

The mobile telephone 10 may further include one or more I/O interface(s) 46. The I/O interface(s) 46 may be in the form of typical mobile telephone I/O interfaces and may include one or more electrical connectors. As is typical, the I/O interface(s) 46 may be used to couple the mobile telephone 10 to a battery charger to charge a battery of a power supply unit (PSU) 48 within the mobile telephone 10. In addition, or in the alternative, the I/O interface(s) 46 may serve to connect the mobile telephone 10 to a headset assembly (e.g., a personal hands-free (PHF) device) that has a wired interface with the mobile telephone 10. Further, the I/O interface(s) 46 may serve to connect the mobile telephone 10 to a personal computer or other device via a data cable for the exchange of data. The mobile telephone 10 may receive operating power via the I/O interface(s) 46 when connected to a vehicle power adapter or an electricity outlet power adapter.

The mobile telephone 10 also may include a system clock 50 for clocking the various components of the mobile telephone 10, such as the control circuit 30. The control circuit 30 may, in turn, carry out timing functions, such as timing the durations of calls, generating the content of time and date stamps, and so forth.

The mobile telephone 10 may include a camera 52 for taking digital pictures and/or movies. Image and/or video files corresponding to the pictures and/or movies may be stored in the memory 16. The mobile telephone 10 also may include a position data receiver 54, such as a global positioning system (GPS) receiver, Galileo satellite system receiver or the like.

The mobile telephone 10 also may include a local wireless interface 56, such as an infrared transceiver and/or an RF interface (e.g., a Bluetooth interface, IEEE 802.11 compliant interface), for establishing communication with an accessory, another mobile radio terminal, a computer, another device, remote sources of multimedia content, etc. For example, the local wireless interface 56 may operatively couple the mobile telephone 10 to a remote server (e.g., an Internet server) for downloading multimedia content stored on the remote server.

Figure 3:
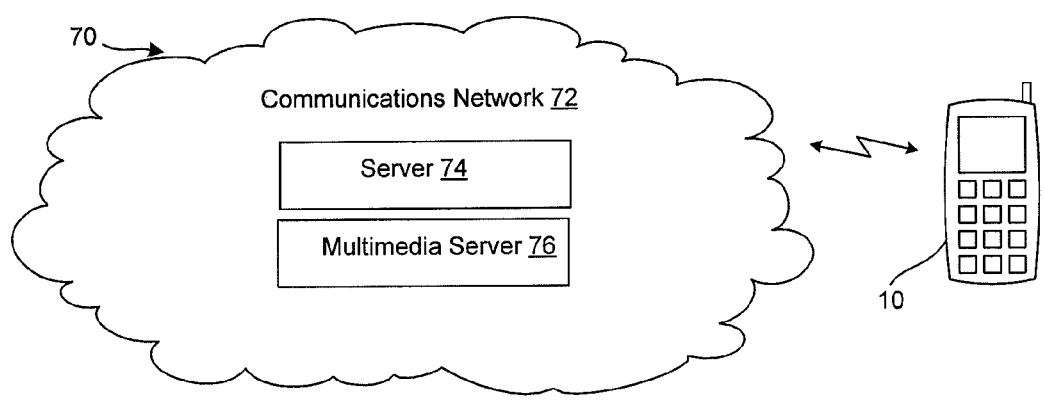
FIG. 3 is a schematic diagram of a communications system in which the mobile telephone of FIG. 1 may operate.

With additional reference to FIG. 3, the mobile telephone 10 may be configured to operate as part of a communications system 70. The system 70 may include a communications network 72 having a server 74 (or servers) for managing calls placed by and destined to the mobile telephone 10, transmitting data to the mobile telephone 10 and carrying out any other support functions. The communications network 72 may also include a multimedia server 76. As used herein, a "multimedia server" is a server that has multimedia content stored thereon and/or operative to be accessed for retrieval of multimedia content from another server. The multimedia server 76 is operable to provide multimedia content for rendering by the mobile telephone 10 or other electronic devices. As set forth above, such multimedia content may include movies, television shows, podcasts, Internet content, etc.

The individual components of the communications network 72 (e.g., server 74 and multimedia server 76) communicate with the mobile telephone 10 through one or more different transmission mediums. The transmission medium may be any appropriate device or assembly, including, for example, a communications tower (e.g., a cell tower), another mobile telephone, a wireless access point, a satellite, etc. Portions of the network may include wireless transmission pathways. The network 72 may support the communications activity of multiple mobile telephones 10 and other types of end user devices. As will be appreciated, the servers 74 and 76 may be configured as a typical computer system used to carry out server functions and may include a processor configured to execute software containing logical instructions that embody the functions of the servers 74 and 76.

Figure 4:
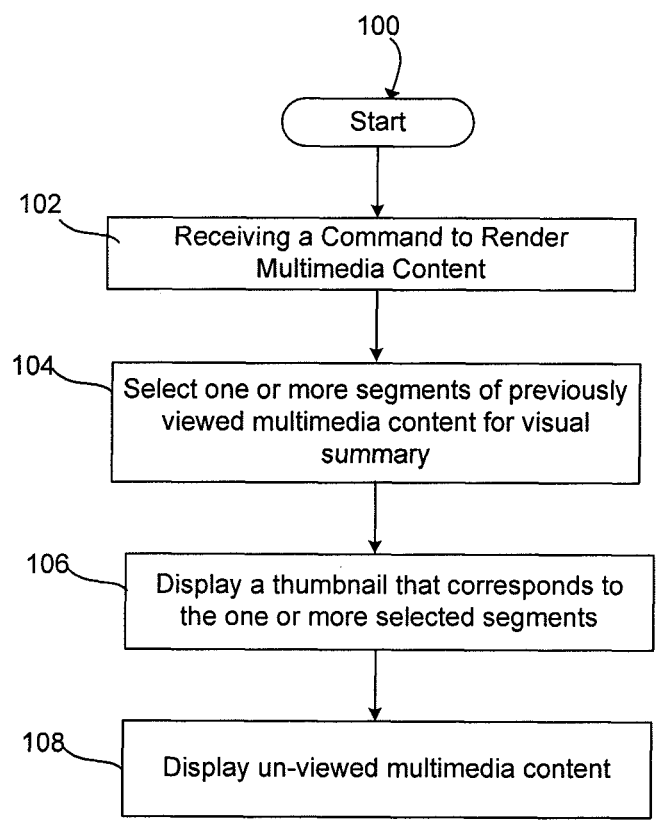
FIGS. 4-7 is a flow chart representing an exemplary method of selecting one or more segments of multimedia content and displaying a visual summary of multimedia content in accordance with aspects of the present invention.

With additional reference to FIG. 4, illustrated are logical operations to implement an exemplary method 100 for resuming multimedia content playback for display on an electronic device. The method 100 is generally applicable when a user is watching multimedia content and is interrupted or experiences a long pause prior to the conclusion of the multimedia content. One of ordinary skill in the art will readily appreciate, the method 100 may also be used to record user interaction such as, for example, searching through a library of music and or videos. A video summary may be provided that illustrates the various music and/or video content viewed by the user.

At block 102, the method includes receiving a command to render multimedia content from a user input device. For purposes of this disclosure, it will be assumed that the multimedia content includes previously viewed multimedia content and un-viewed multimedia content.

At block 104, one or more segments of the previously viewed multimedia content may be selected for use as a visual summary of the previously viewed multimedia content. The one or more segments may be selected by any appropriate mechanism. For example, referring to FIG. 5, in one embodiment, the one or more segments are selected by subdividing the previously viewed portion of the multimedia content into a fixed quantity. One of ordinary skill in the art will readily appreciate that the number of segments may be set by the user, determined dynamically based the length of the viewed portion of the multimedia content, fixed by the originator of the content, for example.

Figure 5:
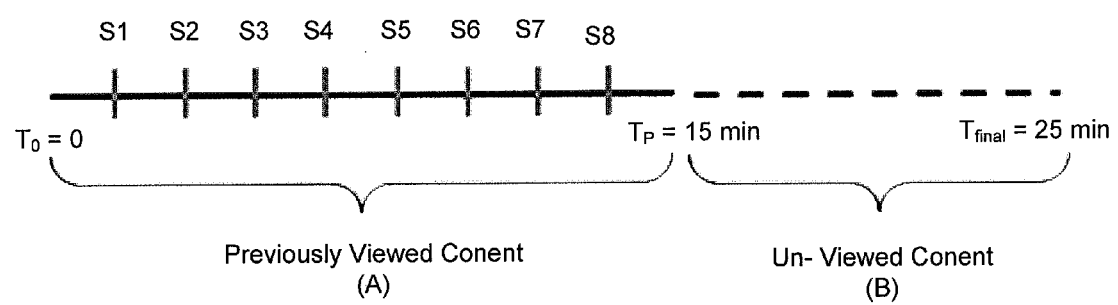

In FIG. 5, the multimedia content is divided into two portions. The first portion is previously viewed content (A) in the second portion is un-viewed content (B). For purposes of convenience, the previously viewed content (A) is illustrated in a solid line and the un-viewed content (B) is illustrated in a dashed line. The viewed content (A) extends from the time $t=0$ to $t_p=15$ minutes, where $t=0$ is the beginning of the multimedia content and $t_p$ is the time in which the multimedia content is stopped and/or paused by the user. This period $t=0$ to $t_p$ corresponds to the elapsed time of the viewed multimedia content. The period from $t_p$ to $t_{final}$ corresponds to the un-viewed multimedia content.

As set forth above, one or more segments of the previously viewed multimedia content (A) may subdivided. As shown in FIG. 5, there are eight (8) segments selected (S1-S8). These segments were selected, for example, by simply dividing the elapsed time by the number of segments. As such, a segment that begins at each of the designated time slots may be selected for the visual summary.

For example, if a television show having a duration of 25 minutes in length, and 15 minutes has been previously viewed before the user paused and/or otherwise stopped playback of the television show on the mobile telephone 10, there would be 15 minutes of previously viewed multimedia content and 10 minutes of un-viewed multimedia content. The 15 minutes of previously viewed multimedia content may be divided into the number of selected segments (e.g., 8 segments, illustrated in FIG. 5). Thus, the selected multimedia content segments would include segments occurring at every 1/N*elapsed time (where N is the number of segments), for example.

Figure 6:
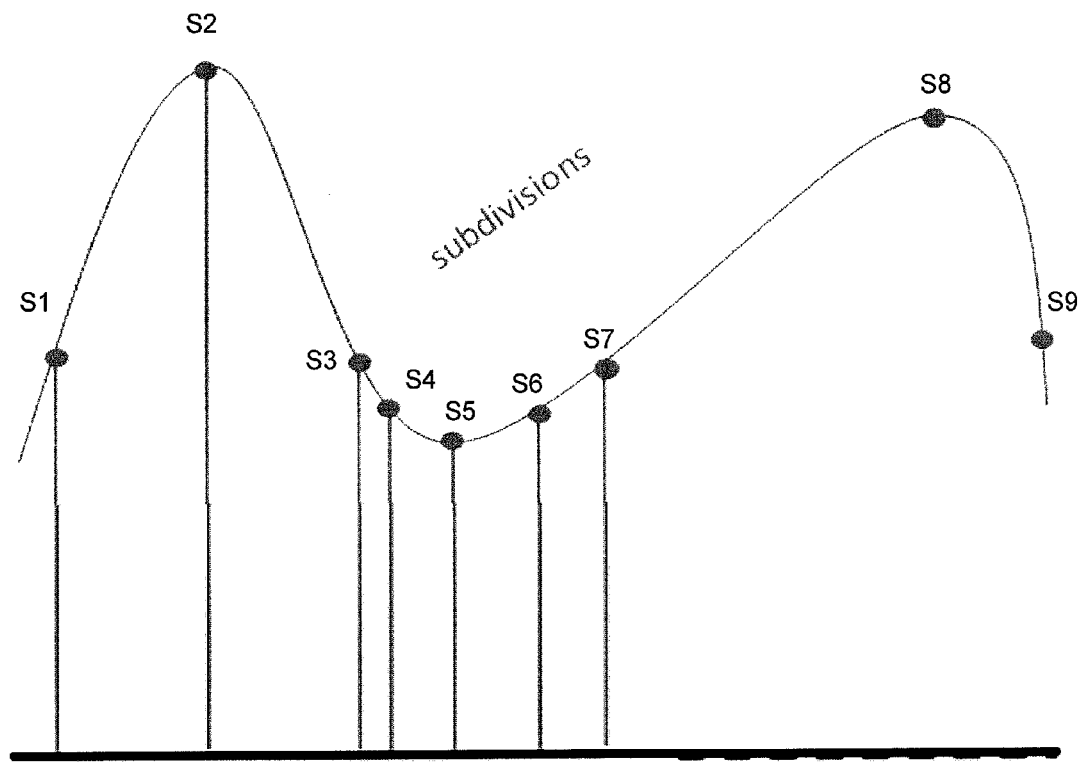

Another embodiment of the invention is illustrated in FIG. 6. In FIG. 6, the subdivisions (S1-S9, for example) are made according to an algorithm. For example, an algorithm may correspond to a standardized curve mapped onto the multimedia content previously viewed. Such an algorithm may place more sample points at the beginning and end of the sequence of previously viewed content, or more sample points in the middle, or more at the end, to conform to one or more models of human memory. For example, models of human memory have shown that people have better recall from the start and end of a piece of multimedia content. In addition, a dramaturgical-type three act structure may also be taken into account. Such a three act structure may be implemented by having more segments in the middle portion of the previously viewed content than the beginning and/or end portions of the content, as illustrated in FIG. 6. For example, FIG. 6 illustrates the beginning and end portions having two (2) segments (S1-S2 and S8-S9, respectively), while the middle portion has five (5) segments selected.

In another embodiment, the segments may be calculated as described in relation to FIGS. 5 and 6, except that start of each segment may be adjusted backwards or forwards to fall on the nearest segment following a fade to black, which is often dramaturgically correlated with the change in scene; adjusted backwards or forwards to the nearest hardcoded chapter division; adjusted backwards or forwards from sequences of quick scene changes; adjusted backwards or forwards from segments containing sustained dialog and/or following the intensity of the audio track associated with the multimedia content. In addition, the segments may be dynamically chosen and/or adjusted based on one or more characteristics of the previously viewed multimedia content.

Figure 7:
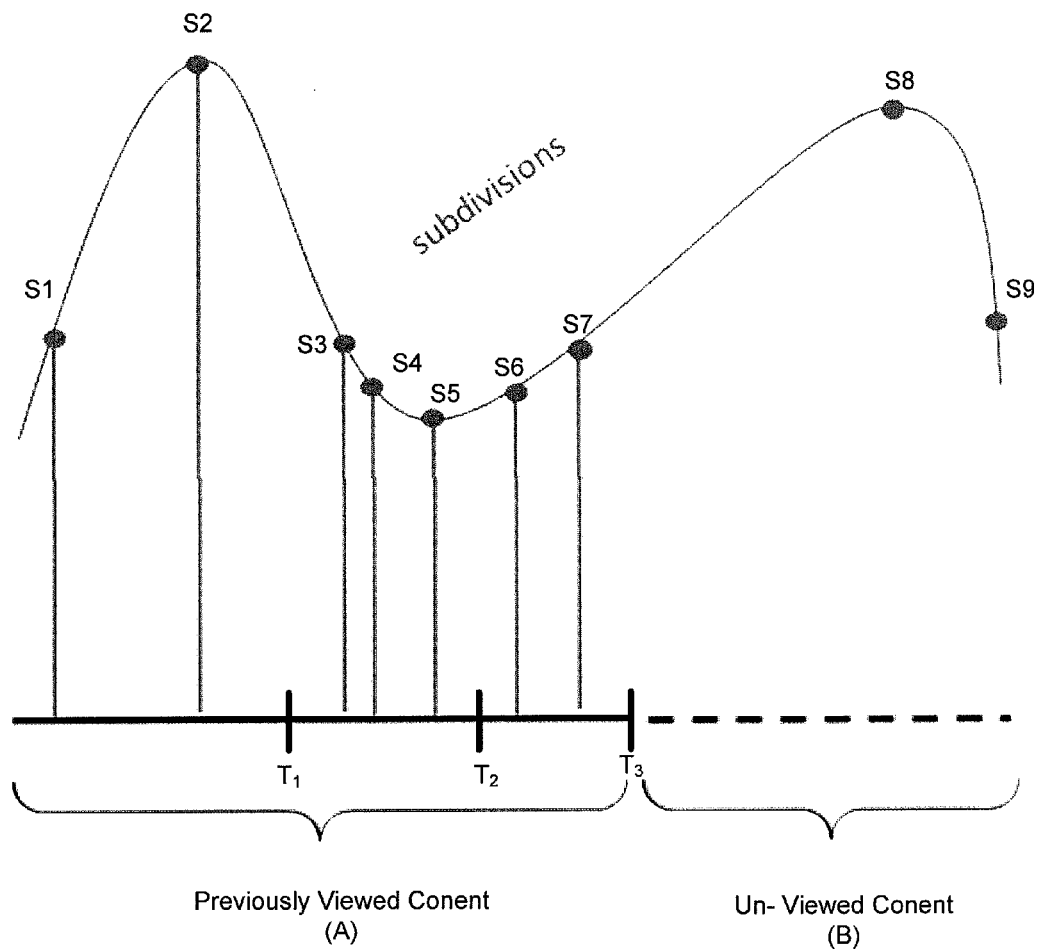

In another embodiment, illustrated in FIG. 7, the segments may be predefined for portions of the entire multimedia content. For example, if a pause occurs at $t_1$, segments S1 and S2 will be selected to form the visual summary. If a pause occurs at $t_2$ segments S1-S5 will be selected to form the visual summary. Likewise, if a pause occurs at $t_3$, segments S1-S7 will be selected to form a visual summary.

The above methods for selecting one or more multimedia content segments are provided for purposes of illustration and not intended to limit the scope of the appended claims.

At block 106, thumbnails corresponding to the selected one or more segments are displayed on a display of the electronic device to provide a visual summary of the previously viewed content. Thumbnails associated with each of the selected segments are aggregated to form the visual summary. The visual summary may be presented in any desired manner. In one embodiment, the visual summary is presented in a collage style presentation mode. In another embodiment, the visual summary is present in a sequential presentation mode.

Figure 8:
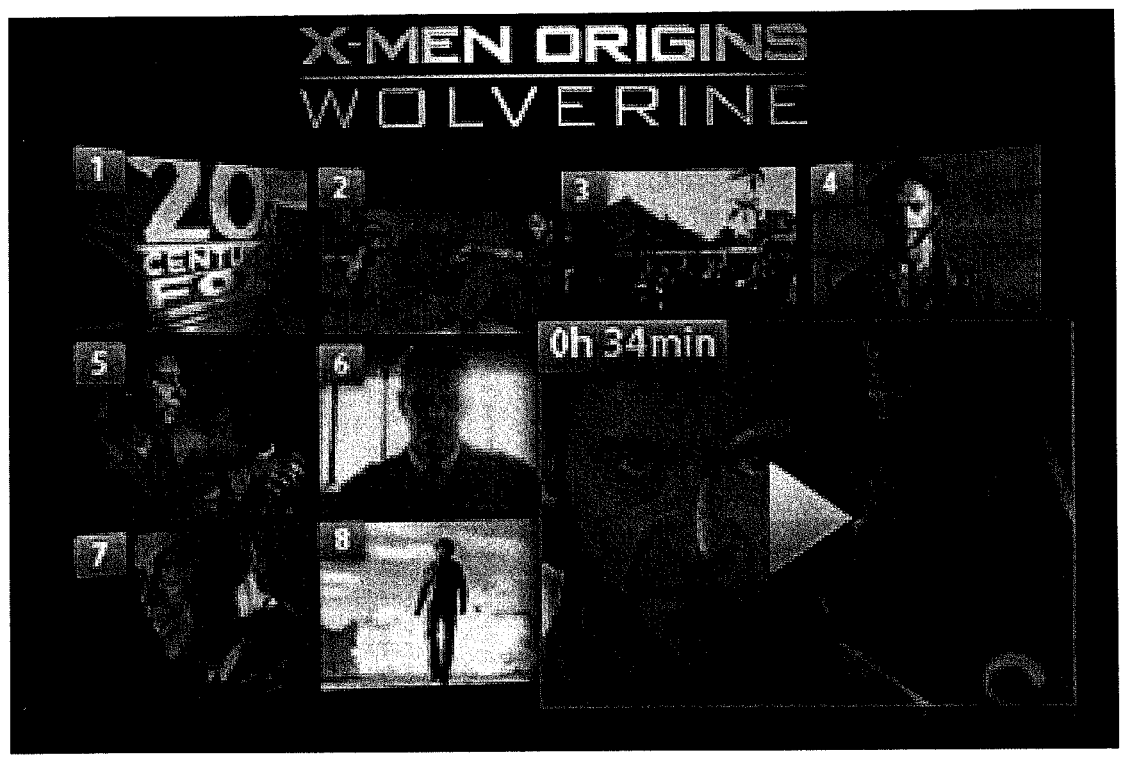
FIG. 8 is an exemplary collage in accordance with aspects of the present invention.

Referring to FIG. 8, in the collage style presentation mode, the previously viewed multimedia content may be summarized by way of a grid of sequentially arrayed thumbnails for one or more of the selected segments. The thumbnails may be still images or short video loops of the previously multimedia content. As shown in FIG. 8, the thumbnails 1-8 are displayed in an ordered manner, with a video clip making up the last thumbnail. The user may select on one or more of the thumbnails. Upon selection or execution of the visual summary, each thumbnail may enlarge and take up a larger portion of the screen. Once the thumbnail that corresponds to the last segment of previously viewed content is presented to the user, the un-viewed portion of the multimedia content may then be presented to the user.

The exemplary collage illustrated in FIG. 8 may be modified in many ways. For example, there are many types of layouts that may be used to illustrate the various thumbnails that correspond to the selected segments. For example, the thumbnails for one or more of the selected segments may be different size. That is, the thumbnails need not be of equal size and the layout may be similar to one or more comic strip layouts, for example. The collage grid illustrated in FIG. 8 may be dynamically generated for any stopping point. For example, in the example illustrated in FIG. 8, if the a user were view 10 more minutes of the multimedia content (e.g., the movie "Wolverine") and then stop, the selected segments and/or thumbnails that correspond to the selected segments may be distinct, which may generate different thumbnails than those illustrated in FIG. 8, for example. In another embodiment, the visual summary may be displayed in any one or more of the following exemplary situations: when a user selects previously viewed content from a list; when the visual summary is incorporated into a full screen video library browsing mode; or the video summary may be displayed whenever multimedia content is paused.

In the sequential presentational mode, the visual summary may be in the form of a short sequence that is played back before resuming the multimedia content at the last stopping point. The selected video segments may be automatically collated into a short video summary. There are many ways in which such a summary sequence could be edited together. For example, there may be video transitions between each of the selected segments. Such video transition effects may include, for example, 3D spin, converge, bounce across and ending credits motion, cross dissolve, disintegrate, twirl, scale down and warp out transitions, etc. Other effects may include fast motion, slow motion, reverse fast/slow motion, brightness and contrast, electricity and fairy dust effects, for example.

In another embodiment, which may be incorporated with both the collage presentation mode and the sequential presentation mode, advertisements and/or a product placement index may also be incorporated in the visual summary. For example, the visual summary may include one or more advertisements selected by the distributor of the multimedia content, the creator of the multimedia content and/or a third party. Such advertisements may correspond to one or more products and/or services shown within the multimedia content and/or related to the multimedia content. In one embodiment, the advertisement may correspond to a list of products and/or services shown within the multimedia content. A user may select one of the products and/or services. Upon selection, one or more thumbnails and/or video clips of the selected products and/or video may be displayed to the user in a visual summary.

At block 108, at least a portion of the un-viewed multimedia content is displayed after at least a portion of the visual summary is displayed on the display.

Generally, the complete visual summary will be presented to the user prior to displaying the un-viewed multimedia content to the user. However, a bypass mechanism may be utilized to allow the user to skip some or all of the visual summary. The bypass mechanism may be any mechanism in which a user may manifest an intent to skip or bypass a portion of or all of the visual summary.

Generally, such a bypass mechanism may be implemented by the user manipulating the user input device 20, for example, by pressing a key, navigating out of the visual summary, etc.

In summary, the multimedia content that has been partially viewed will generally include previously viewed multimedia content (e.g., multimedia content presented to the user) and un-viewed multimedia content (e.g., multimedia content not yet viewed by the user). The visual summary application 14 generally selects one or more segments of the previously viewed multimedia content and displays a thumbnail and/or a video clip of the selected one or more segments on a display of the electronic device to provide a visual summary of the previously viewed content.

After the visual summary has been displayed, the un-viewed multimedia content may be presented to the user.

The exemplary method may be carried out by executing an embodiment of the visual summary application 14, for example. Thus, the flow chart of FIG. 4 may be thought of as depicting steps of a method carried out by the mobile telephone 10. Although FIG. 4 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

Although the invention has been shown and described with respect to certain preferred embodiments, it is understood that equivalents and modifications will occur to others skilled in the art upon the reading and understanding of the specification.

The present invention includes all such equivalents and modifications, and is limited only by the scope of the following claims.

What is claimed is:

1. A method for resuming multimedia content playback for display on an electronic device, the method comprising:
receiving a command to render multimedia content from a user input device, wherein the multimedia content includes previously viewed multimedia content and un-viewed multimedia content, and wherein the multimedia content is divided into predefined segments, one or more of the predefined segments corresponding to the previously viewed multimedia content and one or more of the predefined segments corresponding to the un-viewed multimedia content, each predefined segment having a respective duration that is dependent on its temporal location in the multimedia content;
selecting one or more of the predefined segments corresponding to the previously viewed multimedia content;
displaying one or more thumbnails on a display of the electronic device to provide a visual summary of the previously viewed content, each thumbnail corresponding to a respective one of the selected one or more predefined segments; and
displaying at least a portion of the un-viewed multimedia content after at least a portion of the visual summary is displayed on the display.

2. The method of claim 1, wherein each thumbnail of the selected one or more predefined segments are presented on the display in a collage format.

3. The method of claim 2, wherein each thumbnail of the selected one or more predefined segments are presented in a sequential manner based on a temporal order of the previously viewed content.

4. The method of claim 1, further including receiving user input to bypass display of at least a portion of the visual summary.

5. An electronic device comprising:
a memory for storing multimedia content and a content review application, wherein the multimedia content is divided into predefined segments, each predefined segment having a respective duration that is dependent on its temporal location in the multimedia content;
a user input device for receiving a command to render multimedia content stored on the electronic device, wherein the multimedia content includes at least one multimedia application that includes previously viewed multimedia content and unviewed multimedia content, one or more of the predefined segments of the multimedia content corresponding to the previously viewed multimedia content and one or more of the predefined segments corresponding to the un-viewed multimedia content;
a processor coupled to the user input device and the memory, wherein the processor processes the previously viewed multimedia content according to the content review application to select one or more of the predefined segments corresponding to the previously viewed multimedia content to form a visual summary that includes one or more thumbnails, each thumbnail corresponding to a respective one of the selected one or more predefined segments; and
a display coupled to the processor, wherein the display presents the visual summary prior to displaying at least a portion of the un-viewed multimedia content.

6. The electronic device of claim 5, wherein the electronic device is a mobile telephone.

7. The electronic device of claim 5, wherein the user input device is a keypad.

8. The electronic device of claim 5, wherein the user input device is a touch screen.

9. The electronic device of claim 5, wherein the visual summary is a collage presented on the display, wherein the collage includes thumbnails associated with each of the selected one or more predefined segments.

10. The electronic device of claim 9, wherein at least one thumbnail is associated with a video clip of the selected predefined segment.

11. The electronic device of claim 5, wherein the visual summary includes presenting each thumbnail of the selected one or more predefined segments in a sequential manner based on a temporal order of the previously viewed content.

12. The electronic device of claim 5, wherein the visual summary includes one or more advertisements embedded within the visual summary.

13. The electronic device of claim 5, wherein the visual summary includes one or more product placement indexes in the visual summary.

14. The electronic device of claim 5, wherein the electronic device includes a bypass mechanism for receiving user input to bypass display of at least a portion of the visual summary.

15. The method of claim 1, wherein the respective duration of each predefined segment is defined in accordance with an algorithm corresponding to a standardized curve mapped onto the multimedia content.

16. The method of claim 1, wherein the duration of a predefined segment located toward a middle of the multimedia content is shorter than the duration of a predefined segment located toward a beginning or end of the multimedia content.

17. The method of claim 1, wherein more predefined segments are located toward a middle of the multimedia content than toward a beginning or end of the multimedia content.

18. The electronic device of claim 5, wherein the respective duration of each predefined segment is defined in accordance with an algorithm corresponding to a standardized curve mapped onto the multimedia content.

19. The electronic device of claim 5, wherein the duration of a predefined segment located toward a middle of the multimedia content is shorter than the duration of a predefined segment located toward a beginning or end of the multimedia content.

20. The electronic device of claim 5, wherein more predefined segments are located toward a middle of the multimedia content than toward a beginning or end of the multimedia content.

* * * * *